Oct. 15, 1968   J. B. HEMKER   3,406,320
POSITIONING CONTROL CIRCUIT INCLUDING OVERSHOOT PREVENTION MEANS
Filed Feb. 25, 1965

INVENTOR.
JAMES B. HEMKER
BY

United States Patent Office 3,406,320
Patented Oct. 15, 1968

3,406,320
POSITIONING CONTROL CIRCUIT INCLUDING OVERSHOOT PREVENTION MEANS
James B. Hemker, Milwaukee, Wis., assignor to Square D Company, Park Ridge, Ill., a corporation of Michigan
Filed Feb. 25, 1965, Ser. No. 435,317
7 Claims. (Cl. 318—18)

ABSTRACT OF THE DISCLOSURE

An overtravel preventing circuit for a positioning system including a pair of NOR memories each of which is switched to a first of its bistable states by a common reset signal and is switched to a second of its bistable states by a positioning transducer in response to the direction of movement of a machine tool part as the part moves through a preselected position and supplies a signal through an OR circuit component when in its other bistable state to stop the motor driving the machine tool part in event the motor does not reverse when the machine tool part passes the preselected position.

This invention relates generally to electrical positioning control systems, and more particularly, to logic circuitry for use in such systems which provides an output signal when two input signals to the circuitry are maintained concurrently for a predetermined time interval. The circuitry is usable as a source of an emergency stop signal for causing a controller to effect stopping of a driven machine element in the event the element fails to stop, after passing a preselected position, preparatory to returning to the preselected position.

In the automatic control of machine tools and similar machinery, a transducer is often used to provide a signal to a controller which responds to the signal to cause a motor to drive a machine element in a predetermined direction to a preselected position. Normally the signal changes to cause stoppage of the motor when the element reaches the preselected position, but because of inertia or other factors, the motor occasionally may drive the element beyond the preselected position. The transducer then provides a different signal to the controller which normally responds thereto to effect reversal of the motor and which signal subsequently changes to cause the motor to stop when the element returns to the preselected position.

Occasionally, such a positioning control system malfunctions and the reversal of the motor does not occur when it should. The motor then continues to drive the machine element in the original direction beyond the preselected position. This often has disastrous consequences. The logic circuitry of the present invention, when included in such a system, supplies an emergency stopping signal to the motor controller in event the machine element driven by the motor controlled by the controller fails to stop promptly and to return the machine element to a preselected position after the element has passed the preselected position upon its initial approach.

It is an object of this invention to provide improved logic circuitry operative to produce an output signal a predetermined time after two input signals are applied to the circuitry in the event the two signals continue to be applied concurrently throughout the time interval.

A further object is to provide an improved means for preventing a machine element from travelling too far beyond a preselected stopping position.

A further object is to provide improved logic circuitry which applies an emergency stopping signal to a controller for a motor in the event the motor does not promptly stop and reverse upon driving a machine element beyond a preselected stopping position.

Figure 1:
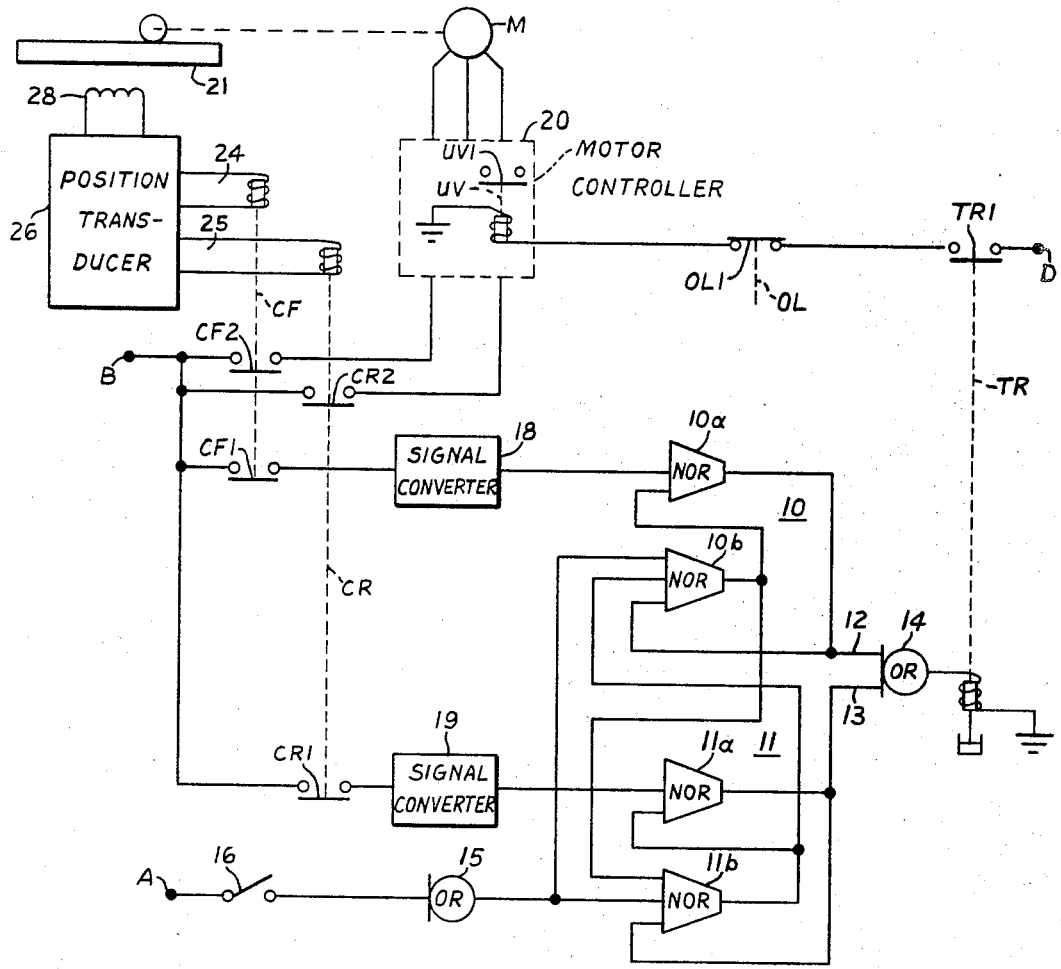

Further objects and advantages of the invention will become apparent from the following description wherein reference is made to the drawings, in which:

FIG. 1 is an elementary wiring diagram illustrating an embodiment of the invention.

Figure 2:
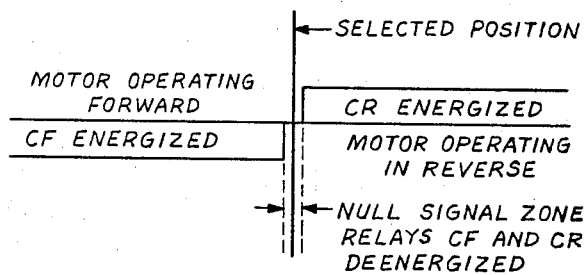

FIG. 2 graphically illustrates the operation of a pair of relays in the circuit shown in FIG. 1.

Referring to FIG. 1 of the drawings, a pair of NOR memories 10 and 11 have their respective outputs 12 and 13 connected as inputs to an OR 14, the output of which is connected to control an electromagnetic timing relay TR having a normally open contact TR1. The relay TR closes its contact TR1 immediately after energization of its operating winding and provides a time delay before opening of the contact TR1 after deenergization at its operating winding.

The NOR memory 10 comprises a pair of NORS 10a and 10b and the NOR memory 11 comprises a pair of NORS 11a and 11b. Preferably, the NOR memories 10 and 11 and the NORS 10a, 10b, 11a, and 11b are of the type described in Patent No. 3,108,258, issued Oct. 23, 1963, and assigned to the assignee of this application.

An OR 15, which might be a simple diode, has its output connected to inputs of the NORS 10b and 11b in order to reset both of the NOR memories 10 and 11 upon momentary closure of a switch 16 which is interposed between a suitable signal source A and the OR 15.

The NOR memories 10 and 11 receive their initiating impulses through signal converters 18 and 19, respectively. The signal converters 18 and 19 are activated to provide the proper voltage level for switching of the NOR memories 10 and 11 upon closure of normally open contacts CF1 and CR1, respectively, of electromagnetic relays CF and CR which also have normally open contacts CF2 and CR2, respectively. The contacts CF1 and CR1 are interposed in respective circuits leading from a suitable source of voltage B to the signal converters 18 and 19. The contacts CF2 and CR2 are interposed in respective circuits leading from the source of voltage B to a conventional motor controller 20 which is arranged in a well-known manner to control an alternating current motor M driving a machine element 21.

The relays CF and CR are controlled by voltages appearing at outputs 24 and 25, respectively, of a suitable position transducer 26 having a pick-up coil 28 positioned adjacent the path of movement of the machine element 21. A suitable transducer is shown in Bulliet et al. Patent No. 2,962,652, issued Nov. 29, 1960. Although the motor M has been illustrated as an electric motor, it will be understood that other types of actuators, such as a hydraulic motor, might be used.

The contact CF2, when closed, completes a circuit from the source B to the controller 20 which normally causes the controller 20 to energize the motor M so that it operates in a forward direction and the contact CR2, when closed, completes a circuit from the source B to the controller 20 which normally causes the controller 20 to energize the motor M so that it operates in a reverse direction. During an interval when the motor M operates in the forward direction to drive the machine element 21 to a preselected position, an output signal which appears at the output 24 of the transducer 26 energizes the relay CF and the contacts CF1 and CF2 are closed. Similarly, during the interval when the motor M operates in the reverse direction to drive the machine element 21 to a predetermined position, an output signal at the output 25 of the transducer 26 energizes the relay CR and the contacts CR1 and CR2 are closed.

Assuming the motor M to be energized to operate in the forward direction, stopping of the machine element 21 at a preselected position is effected by deenergization of the relay CF and consequent opening of the contacts CF1 and CF2. The relay CF is deenergized as a result of a null signal at the pick-up coil 28 causing a reduction in the voltage at the output 24. If during the traverse of the machine element to the preselected position the motor M should fail to stop promptly, so the machine element 21 overshoots the preselected position, thereupon the pick-up coil 28 receives a signal causing a voltage to appear at the output 25 sufficient to energize the relay CR. The relay CR then closes its contact CR2 which normally causes the motor M to reverse. The relay CR is deenergized and opens its contact CR2 to stop the motor M when the machine element 21 has returned to the preselected position. The relay CR is deenergized as a result of a null signal at the pick-up coil 28 causing a reduction in the voltage of the output 25. Operation similar to the foregoing occurs also when the initial operation of the motor M is in the reverse direction.

The logic circuitry now to be described provides an emergency stopping signal which effects stopping of the motor M in event the motor M continues to operate beyond its correct stopping position. Such malfunctioning of the positioning system can occur, for example, as a result of an electromagnetic forward contactor (not shown) of the controller 20 not dropping out upon opening of the relay CF2 and thereby preventing closure of an electromagnetic reverse contactor (not shown) which normally would close upon closure of the relay CR2.

During standby conditions with both of the contacts CF1 and CR1 open and preparatory to an operation of the motor M, a signal from a command signal source, not shown, which is connected to terminal A, provides a momentary "1" reset signal when the switch 16 is momentarily closed through the OR 15 to the NORS 10b and 11b. The momentary "1" signal resets the NOR memories 10 and 11 so that both outputs 12 and 13 provide a "1" signal. With the contacts CF1 open, the signal converter 18 supplies a "0" signal to the NOR 10a permitting the NOR 10a to have a "1" output which is applied as an input to the NOR 10b to thus maintain the memory 10 in the reset condition. Similarly, with the contacts CR1 open, the signal converter 19 supplies a "0" signal to the NOR 11a which permits the NOR 11a to have a "1" output which is applied as an input to the NOR 11b to also maintain the NOR memory 11 in a reset condition.

When the NOR memories are in their reset condition, both of the outputs 12 and 13 supply "1" signals to the OR 14 which therefor supplies a "1" signal to the relay TR resulting in closure of its contact TR1 without time delay. Closure of the contract TR1 completes a circuit from a suitable voltage source D to an undervoltage relay UV of the controller 20. With the undervoltage relay UV energized and its contact UV1 closed, the controller 20 can supply operating voltage to the motor M upon receipt of the source B resulting from closure of either of the contacts CF2 and CR2. A contact OL1 of an overload relay OL illustrates other protective contacts normally interposed in an undervoltage protection circuit for a motor controller, such as the controller 20.

If the motor M is to travel in the forward direction, the transducer 26 causes a voltage to appear at the output 24 which energizes the relay CF and causes the contacts CF1 and CF2 to close. The closed contact CF2 causes the controller 20 to effect forward operation of the motor M. The closed contact CF1 causes the signal converter 18 to supply a "1" signal to the NOR 10a which causes its output 12 to switch from a "1" to a "0." The "0" output of the NOR 10a is supplied as an input to the NOR 10b and the OR 12. The "0" signal at the NOR 10b from the NOR 10a as well as the "0" signals from the OR 15 and the NOR 11b permits the output of the NOR 10b to switch from a "0" to a "1" which is supplied as an input to the NOR 10a to maintain the memory 10 in its switched condition. The "1" signal from the NOR 10b to the NOR 11b maintains the output of the NOR 11b at "0." With the output of the NOR 11b maintained at "0," the NOR 11a maintains its output 13 as "1" which is delivered to the OR 14. Consequently, even though the OR 14 receives a "0" signal from the NOR 10a, it continues to receive a "1" signal from the NOR 11a so that the output of the OR 14 remains "1" and the relay TR continues to be energized.

When the machine element 21 reaches the preselected position, the voltage at the output 24 of the transducer 26 becomes zero, and the relay CF drops out if the system is functioning correctly. The contact CF2 then opens to cause the controller 20 to effect stopping of the motor M, and the contact CF1 opens to permit the NOR memory 10 to switch from a "0" to a "1" ouput upon the receipt of a suitable input signal to the NOR 10b as is caused by a momentary "1" signal from the OR 15 in response to a momentary closure of the switch 16.

Similar operation occurs when the relay contact CR1 is initially closed for reverse operation as a result of a signal at the output 25 except that the output 13 of the NOR memory 11 changes from a "1" to a "0" instead of the NOR memory 10.

As shown in FIG. 2, when the relay CF is energized to operate the motor M in a forward direction, when the machine element 21 approaches the preselected position, the output signal at the output 24 of the transducer 26 deenergizes relay CF. In the event the machine element 21, for some cause, continues its movement in the forward direction a small distance beyond the preselected position, the relay CR will be energized as a result of a voltage appearing at the output 25. Relay CR when energized closes its contact CR2 to supply a voltage to the controller 20, which effects a reversal of the motor M which will normally drive the machine element 21 in the reverse direction toward the preselected position. When the relay CF was initially energized to drive the machine element 21 in a forward direction, a "1" signal input from the converter 18 caused the NOR memory 10 to switch so the NOR 10b supplied a "1" input signal to the NOR 10a. Thus when the relay CF is subsequently deenergized, as the machine element 21 approached the preselected position, the NOR memory 10 does not switch its condition in response to the opening of the contacts CF1.

When the relay CR is energized subsequent to the switching of the NOR memory 10 to the condition wherein the NOR 10a supplies a "0" signal to the output 12, the closure of contacts CR1 causes the signal converter 19 to provide a "1" input to the NOR 11a. At this instant, both of the NORS 10a and 11a are receiving a "1" input so that both of the outputs 12 and 13 are "0." The output 13 of the NOR 11a thus supplies a "0" signal to the OR 14 which also is receiving a "0" signal through the output 12 from the NOR 10a. Thus, the two input signals at the OR 14 are "0" and the OR 14 delivers a "0" signal to the time delay relay TR which thereupon is deenergized to start a timing period prior to opening the contact TR1.

If the system is operating properly, the machine element 21 will be driven in the reverse direction toward the preselected position and the relay CR will be promptly deenergized and the "1" signal from the signal converter 19 will become "0" which permits the output 13 of the NOR 11a to switch from a "0" to a "1." This causes the output of the OR 14 to switch from a "0" to a "1" so that the time delay relay TR is reenergized, stopping the timing operation. However, if the system malfunctions, and the contact CR1 does not open, the "0" signals supplied through the outputs 12 and 13 to the OR 14 persist. After a predetermined time, the time delay relay TR operates to open its contact TR1 thereby deenergizing the undervoltage relay UV and causing opening of its contacts UV1. As a result, the controller 20 removes power from the motor M.

Operation similar to the foregoing occurs when the motor M is initially operated in the reverse direction as a result of energization of the relay CR and the relay CF is not deenergized within a predetermined time after the machine element 21 has moved past the preselected position in a reverse direction.

While certain preferred embodiments of the invention have been specifically disclosed, it is understood that the invention is not limited thereto, as many variations will be readily apparent to those skilled in the art and the invention is to be given its broadest possible interpretation within the terms of the following claims:

What is claimed is:

1. Logic circuitry for a positioning system, said circuitry comprising first and second multi-input NOR memories, means for resetting said NOR memories concurrently so that each provides the same reset output value as the other, a pair of switching means operative to provide a switching signal to said NOR memories, respectively, operation of one of said switching means causing said first NOR memory to switch from its reset output value to its other output value, the other of said switching means being operative to switch said second NOR memory from its reset output value to its other output value, a time delay means and means for applying the outputs of both of said NOR memories to the time delay means, said time delay means being operative to start a timing function when both of said NOR memories have outputs of said other value.

2. Logic circuitry in accordance with calim 1 characterized in that said reset output value is "1" and said other output value is "0."

3. Logic circuitry in accordance with claim 1 characterized in that each of said NOR memories comprises a pair of NORS.

4. Logic circuitry in accordance with claim 3 characterized in that connection means are provided to supply an output of one of the NORS of said first NOR memory to an input of one of the NORS of said second NOR memory to maintain said second NOR memory in its reset condition upon switching of said first NOR memory to said other output value and to supply the output of the said one NOR of the second NOR memory to an input of the said one NOR of the first NOR memory to maintain said first NOR memory in its reset condition upon switching of said second NOR memory to said other output value.

5. Logic circuitry in accordance with claim 1 characterized in that said time delay means comprises an electromagnetic relay providing a time delay in its operation after deenergization.

6. Logic circuitry for a positioning system in which a motor drives a machine element and a transducer responsive to the position of the machine element supplies output voltage signals to a controller for the motor and to the logic circuitry, said logic circuitry comprising first and second multi-input NOR memories, means for resetting said NOR memories concurrently so that each provides the same reset output value as the other, a pair of switching means operative in response to the respective outputs of said transducer to provide switching signals to said NOR memories, respectively, operation of a first one of said switching means causing said first NOR memory to switch from its reset output value to its other output value, operation of a second one of said switching means causing said second NOR memory to switch from its reset ouptut value to its other output value, a time delay means, means applying the outputs of both of said NOR memories to said time delay means, said time delay means being operative to start a timing function when the outputs of both of said NOR memories are at said other values, and said time delay means including means operable to cause the motor controller to stop the motor at the expiration of the time interval provided by said time delay means.

7. A positioning system comprising a motor, a machine element driven by the motor, a controller for the motor, logic circuitry, a transducer responsive to the position of the machine element to supply output voltages selectively to said controller and to said logic circuitry, said logic circuitry including first and second multi-input NOR memories, means for resetting said NOR memories concurrently so that each provides the same reset output value as the other, a pair of switching means operative in response to the respective outputs of said transducer to provide switching signals to said NOR memories, respectively, operation of a first one of said switching means causing said first NOR memory to switch from its reset output value to its other output value, operation of a second one of said switching means causing said second NOR memory to switch from its reset output value to its other output value, a time delay means, means applying the outputs of both of said NOR memories to said time delay means, said time delay means being operative to start a timing function when the outputs of both of said NOR memories are at said other values, and said time delay means including means operative to cause said motor controller to stop said motor at the expiration of the time interval provided by said time delay means.

References Cited

UNITED STATES PATENTS

| | | | |
|---|---|---|---|
| Re. 26,082 | 9/1966 | Osborne | 307—88.5 |
| 3,107,306 | 10/1963 | Dobbie | 307—88.5 |
| 3,249,769 | 5/1966 | Mierendorf | 307—88.5 |
| 3,291,973 | 12/1966 | Rusche | 307—88.5 |
| 3,323,067 | 5/1967 | Eckl | 307—88.5 |

ORIS L. RADER, *Primary Examiner.*